United States Patent
Hamada et al.

(10) Patent No.: US 12,420,452 B2
(45) Date of Patent: Sep. 23, 2025

(54) MACHINE LEARNING METHOD, MACHINE LEARNING DEVICE, MACHINE LEARNING PROGRAM, COMMUNICATION METHOD, AND KNEADING DEVICE

(71) Applicant: KOBE STEEL, LTD., Hyogo (JP)

(72) Inventors: Hikaru Hamada, Takasago (JP); Yasuaki Yamane, Takasago (JP); Norifumi Yamada, Takasago (JP); Kazuo Miyasaka, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 406 days.

(21) Appl. No.: 17/996,397

(22) PCT Filed: May 14, 2021

(86) PCT No.: PCT/JP2021/018408
§ 371 (c)(1),
(2) Date: Oct. 17, 2022

(87) PCT Pub. No.: WO2021/241278
PCT Pub. Date: Dec. 2, 2021

(65) Prior Publication Data
US 2023/0202070 A1    Jun. 29, 2023

(30) Foreign Application Priority Data

May 29, 2020  (JP) .................................. 2020-094033
Dec. 11, 2020 (JP) .................................. 2020-205926

(51) Int. Cl.
*B29B 7/72*     (2006.01)
*B29B 7/60*     (2006.01)

(52) U.S. Cl.
CPC .............. *B29B 7/728* (2013.01); *B29B 7/603* (2013.01)

(58) Field of Classification Search
CPC ........... B29B 7/46; B29B 7/603; B29B 7/726; B29B 7/728; B29B 7/183; B29B 7/186;
(Continued)

(56) References Cited

U.S. PATENT DOCUMENTS

2003/0090955 A1*  5/2003  Murakami ................ B29B 7/60
                                                             366/85
2016/0325249 A1   11/2016  Urakami et al.
(Continued)

FOREIGN PATENT DOCUMENTS

CN      110944815 B     10/2021
JP      2020-032676 A   3/2020
(Continued)

*Primary Examiner* — Chun Cao
(74) *Attorney, Agent, or Firm* — Studebaker Brackett PLLC

(57) ABSTRACT

A machine learning method includes: acquiring a state variable including at least one first evaluation parameter related to performance evaluation of a kneaded product and at least one kneading condition; calculating a reward for a decision result of the at least one kneading condition based on the state variable; updating a function for deciding the at least one kneading condition from the state variable based on the reward; and by repeating the update of the function, deciding a kneading condition under which the reward obtained becomes maximum, in which the at least one first evaluation parameter includes at least one of physical properties and shape characteristics related to the kneaded product.

18 Claims, 10 Drawing Sheets

(58) Field of Classification Search
CPC ........... B29B 7/24; B29B 7/283; B29B 7/286;
B29B 7/7495; B29B 7/823
USPC ........................................................ 700/117
See application file for complete search history.

(56) References Cited

U.S. PATENT DOCUMENTS

| | | |
|---|---|---|
| 2018/0259946 A1 | 9/2018 | Kadokura |
| 2020/0002502 A1* | 1/2020 | Yamamoto ................ B29B 9/12 |
| 2020/0198184 A1 | 6/2020 | Matsushita et al. |
| 2020/0282371 A1 | 9/2020 | Matsushita et al. |
| 2021/0362374 A1* | 11/2021 | Sameshima ............... B29B 7/48 |
| 2022/0118653 A1* | 4/2022 | Maenishi .................. B29B 7/72 |

FOREIGN PATENT DOCUMENTS

| | | |
|---|---|---|
| KR | 10-2018-0103002 A | 9/2018 |
| KR | 10-2019-0045421 A | 5/2019 |
| WO | 2019/008727 A1 | 1/2019 |

\* cited by examiner

FIG. 3

| KNEADING CONDITION | | |
|---|---|---|
| MEDIUM GROUP | SMALL GROUP | DETAILS |
| MATERIAL (FIRST PARAMETER) | KIND OF INPUT MATERIAL (INCLUDING MIXING AMOUNT) | |
| | MATERIAL WEIGHT | |
| | MATERIAL SPECIFIC GRAVITY | |
| | INPUT ORDER | |
| | FILLING FACTOR | |
| ROTOR CONTROL (SECOND PARAMETER) | NUMBER OF ROTATIONS OF ROTOR | AT THE TIME OF 1st. MATERIAL INPUT |
| | | AT THE TIME OF 1st. KNEADING |
| | | AT THE TIME OF 2nd. MATERIAL INPUT OR CLEANING |
| | | AT THE TIME OF 2nd. KNEADING |
| | | AT THE TIME OF 3rd. MATERIAL INPUT OR CLEANING |
| | | AT THE TIME OF 3rd. KNEADING |
| | | ... |
| | ROTOR PHASE | |
| | ROTOR SPEED RATIO | |

FIG. 4

| KNEADING CONDITION | | |
|---|---|---|
| MEDIUM GROUP | SMALL GROUP | DETAILS |
| OPERATION STEP (THIRD PARAMETER) | KNEADING TIME IN EACH STEP | 1st KNEADING STEP |
| | | 2nd KNEADING STEP |
| | | 3rd KNEADING STEP |
| | | ... |
| | MATERIAL INPUT TIME | 1st INPUT STEP |
| | | 2nd INPUT STEP |
| | | 3rd INPUT STEP |
| | | ... |
| | STEP PROCEEDING CONDITION | KNEADING TIME |
| | | MATERIAL TEMPERATURE |
| | | TEMPERATURE OF TEMPERATURE-KEEPING KNEADING |
| | | INSTANT ELECTRIC POWER |
| | | ACCUMULATED ELECTRIC POWER |
| | | INSTANT ELECTRIC CURRENT |
| | | TORQUE |
| | | MATERIAL TEMPERATURE AT DISCHARGING |
| | TOTAL KNEADING TIME | |
| | ACCUMULATED ELECTRIC POWER | |

FIG. 5

| KNEADING CONDITION | | |
|---|---|---|
| MEDIUM GROUP | SMALL GROUP | DETAILS |
| WEIGHT OPERATION (FOURTH PARAMETER) | WEIGHT CYLINDER PRESSURE | 1st KNEADING STEP |
| | | 2nd KNEADING STEP |
| | | 3rd KNEADING STEP |
| | | ... |
| | WEIGHT POSITION | |
| | WEIGHT SPEED | ... |
| TEMPERATURE ADJUSTMENT (FIFTH PARAMETER) | OUTSIDE AIR TEMPERATURE | |
| | TEMPERATURE OF EACH PART OF MACHINE | |
| | TEMPERATURE OF CIRCULATING MEDIUM | CHAMBER-IN |
| | TEMPERATURE OF CIRCULATING MEDIUM | CHAMBER-OUT |
| | TEMPERATURE OF CIRCULATING MEDIUM | ROTOR-IN |
| | TEMPERATURE OF CIRCULATING MEDIUM | ROTOR-OUT |
| | TEMPERATURE OF CIRCULATING MEDIUM | WEIGHT-IN |
| | TEMPERATURE OF CIRCULATING MEDIUM | WEIGHT-OUT |
| | TEMPERATURE OF CIRCULATING MEDIUM | DOOR-IN |
| | TEMPERATURE OF CIRCULATING MEDIUM | DOOR-OUT |

FIG. 6

| KNEADING CONDITION | |
|---|---|
| MEDIUM GROUP | SMALL GROUP |
| MACHINE SPECIFICATIONS (SIXTH PARAMETER) | ROTOR KIND |
| | SURFACE TREATMENT |
| | DOOR-TOP SHAPE |
| | WEIGHT SHAPE |

FIG. 7

| FIRST EVALUATION PARAMETER | |
|---|---|
| MEDIUM GROUP | SMALL GROUP |
| PHYSICAL PROPERTIES | MOONEY VISCOSITY |
| | VULCANIZATION PROPERTIES |
| | PAYNE EFFECT |
| | DISPERSION OF ADDITIVE |
| | DYNAMIC VISCOELASTICITY (Tan $\delta$) |
| | HARDNESS |
| | TENSION STRESS |
| | ELONGATION |
| | TENSION STRENGTH |
| | REAL DISCHARGE WEIGHT |
| | REAL DISCHARGE TEMPERATURE |
| | WEAR PROPERTIES |
| | BENDING STRENGTH |
| | IMPACT STRENGTH |
| | BREAKING STRENGTH |
| | MODULUS OF ELASTICITY |
| | CAPILLARY VISCOSITY |
| | FLUIDITY |
| | NUMBER OF ROTATIONS OF RUBBER KNEADING (AMOUNT OF SURFACE UPDATE) |
| SHAPE CHARACTERISTICS | REMAINING PARTICLES |
| | SURFACE PROPERTIES |

FIG. 8

| SECOND EVALUATION PARAMETER ||
|---|---|
| MEDIUM GROUP | SMALL GROUP |
| STATE – WEIGHT | WEIGHT PRESSURE FLUCTUATION |
| STATE – BEARING | THRUST LOAD |
| | RADIAL LOAD |
| STATE – HYDRAULIC PRESSURE | MIXER CIRCUIT PRESSURE |
| | WEIGHT CIRCUIT PRESSURE |
| | OIL CLEANLINESS |
| STATE – ROTOR | INSTANT ELECTRIC POWER |
| | ACCUMULATED ELECTRIC POWER |
| | INSTANT ELECTRIC CURRENT |
| | TORQUE |

MACHINE LEARNING METHOD, MACHINE LEARNING DEVICE, MACHINE LEARNING PROGRAM, COMMUNICATION METHOD, AND KNEADING DEVICE

FIELD OF THE INVENTION

The present invention relates to a technique of machine learning of kneading conditions for a kneading device.

BACKGROUND ART

In Patent Literature 1, a machine learning model is generated which indicates whether kneading is normal or abnormal by means of machine learning of learning data including: measurement data, representing a state of a internal rubber kneader, such as an instant electric power value, a temperature, the number of rotations of a rotor, a position of a ram, and the like; and given training data indicative of a kneading abnormality degree corresponding to the measurement data. Then, there is disclosed a technique of determining whether kneading is abnormal or not by using the machine learning model.

However, Patent Literature 1 relates to a technique of determining whether kneading is abnormal or not by using a machine learning model but not to a technique of deciding a kneading condition in a kneading device. Therefore, Patent Literature 1 does not enable decision of a kneading condition under which an appropriate kneaded product is obtained.

Appropriate kneading conditions have been conventionally decided by skilled operators based on years of experience and are therefore difficult to be decided with ease.

CITATION LIST

Patent Literature

Patent Literature 1: Japanese Unexamined Patent Publication No. 2020-32676

SUMMARY OF THE INVENTION

The present invention has been made in order to solve the above-described problem and aims to provide a machine learning device and the like which decide, with ease, a kneading condition under which an appropriate kneaded product is obtained without relying on years of experience of skilled operators.

A machine learning method according to one aspect of the present invention is a machine learning method for a machine learning device to decide a kneading condition of a kneading device for kneading a polymer material to obtain a kneaded product, the kneading device including: a chamber to which a material to be kneaded is input; two or more rotors which knead the material input to the chamber; and a controller in charge of control of the two or more rotors, control of a kneading time of the material, and control of an operation step of the kneading device, the machine learning method including: acquiring a state variable including at least one first evaluation parameter related to performance evaluation of the kneaded product and at least one kneading condition; calculating a reward for a decision result of the at least one kneading condition based on the state variable; updating a function for deciding the at least one kneading condition from the state variable based on the reward; and by repeating the update of the function, deciding a kneading condition under which the reward obtained becomes maximum, in which the at least one first evaluation parameter includes at least one of physical properties and shape characteristics related to the kneaded product.

A machine learning device according to another aspect of the present invention is a machine learning device which decides a kneading condition of a kneading device for kneading a polymer material to obtain a kneaded product, the kneading device including: a chamber to which a material for obtaining the kneaded product is input; two or more rotors which knead the material input to the chamber; and a controller in charge of control of the two or more rotors, control of a kneading time of the material, and control of an operation step of the kneading device, the machine learning device including: a state acquisition unit which acquires a state variable including at least one first evaluation parameter related to performance evaluation of the kneaded product and at least one kneading condition; a reward calculation unit which calculates a reward for a decision result of the at least one kneading condition based on the state variable; an update unit which updates a function for deciding the at least one kneading condition from the state variable based on the reward; and a decision unit which, by repeating the update of the function, decides a kneading condition under which the reward obtained becomes maximum, in which the at least one first evaluation parameter includes at least one of physical properties and shape characteristics related to the kneaded product.

A recording medium according to yet another aspect of the present invention is a machine learning program of a machine learning device which decides a kneading condition of a kneading device for kneading a polymer material to obtain a kneaded product, the kneading device including: a chamber to which a material for obtaining the kneaded product is input; two or more rotors which knead the material input to the chamber; and a controller in charge of control of the two or more rotors, control of a kneading time of the material, and control of an operation step of the kneading device, the machine learning program causing a computer to function as, the machine learning device comprising: a state acquisition unit which acquires a state variable including at least one first evaluation parameter related to performance evaluation of the kneaded product and at least one kneading condition; a reward calculation unit which calculates a reward for a decision result of the at least one kneading condition based on the state variable; an update unit which updates a function for deciding the at least one kneading condition from the state variable based on the reward; and a decision unit which, by repeating the update of the function, decides a kneading condition under which the reward obtained becomes maximum, in which the at least one first evaluation parameter includes at least one of physical properties and shape characteristics related to the kneaded product.

A communication method according to still another aspect of the present invention is a communication method conducted at the time of machine learning of a kneading condition of a kneading device which kneads a polymer material to obtain a kneaded product, the kneading device including: a chamber to which a material for obtaining the kneaded product is input; two or more rotors which knead the material input to the chamber; and a controller in charge of control of the two or more rotors, control of a kneading time of the material, and control of an operation step of the kneading device, the communication method including: observing a state variable including at least one first evaluation parameter related to performance evaluation of the kneaded product and at least one kneading condition; transmitting the state variable onto a network; and receiving a machine-learned kneading condition, the at least one first evaluation parameter including at least one of physical properties and shape characteristics related to the kneaded product.

A kneading device according to still another aspect of the present invention is a kneading device which kneads a polymer material to obtain a kneaded product, the kneading device including: a chamber to which a material for obtaining the kneaded product is input; two or more rotors which knead the material input to the chamber; a controller in charge of control of the two or more rotors, control of a kneading time of the material, and control of an operation step of the kneading device; a state observation unit which acquires a state variable including at least one first evaluation parameter related to performance evaluation of the kneaded product and at least one kneading condition; and a communication unit which transmits the state variable onto a network and receives a machine-learned kneading condition, in which the at least one first evaluation parameter includes at least one of physical properties and shape characteristics related to the kneaded product.

According to the present invention, an appropriate kneading condition can be decided with ease without relying on years of experience of skilled operators.

BRIEF DESCRIPTION OF THE DRAWINGS

FIG. 3 is a diagram showing one example of a kneading condition;

FIG. 4 is a diagram showing one example of a kneading condition;

FIG. 5 is a diagram showing one example of a kneading condition;

FIG. 6 is a diagram showing one example of a kneading condition;

FIG. 7 is a diagram showing one example of a first evaluation parameter;

FIG. 8 is a diagram showing one example of a second evaluation parameter;

DESCRIPTION OF EMBODIMENTS

Embodiments of the present invention will be described below with reference to the accompanying drawings. The embodiments below are one example only and do not limit a technical scope of the present invention.

Figure 1:
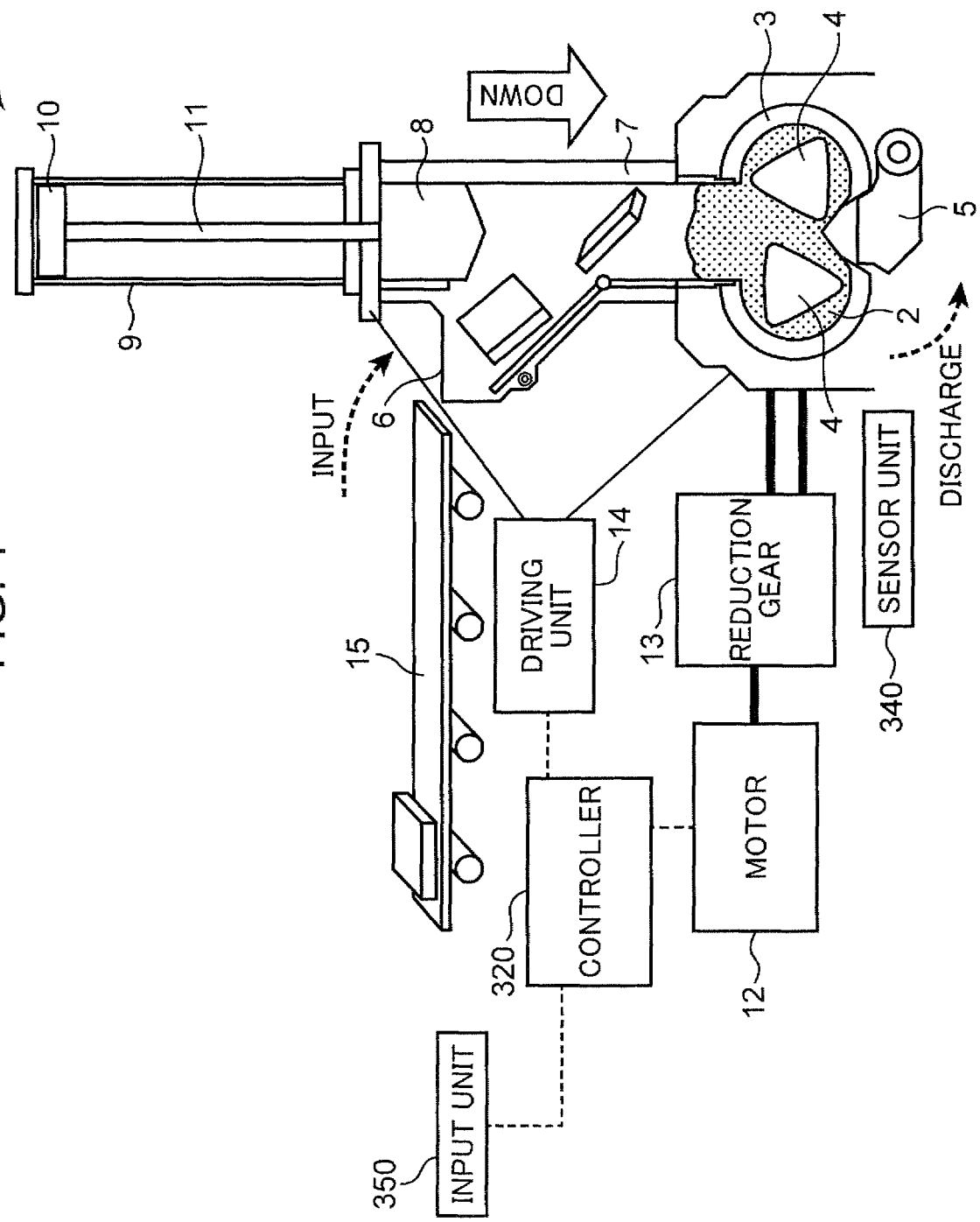
FIG. 1 is a front sectional view of a kneading device according to a present embodiment.

FIG. 1 is a front sectional view of a kneading device 300 according to the present embodiment. As shown in FIG. 1, the kneading device 300 includes a casing 3, a pair of rotors (one example of two or more rotors) 4, a door 5, a hopper 6, a weight 8, a cylinder 9, a piston 10, a piston rod 11, a motor 12, a reduction gear 13, a driving unit 14, a controller 320, and an input unit 350. The casing 3 internally has a chamber 2. The pair of rotors 4 is provided inside the chamber 2. The hopper 6 is provided in a supply cylinder 7.

The supply cylinder 7 is vertically arranged above the casing 3 to supply the chamber 2 with a material input from the hopper 6. The weight 8 is inserted to freely move up and down in the supply cylinder 7.

The cylinder 9 is configured by, for example, a hydraulic cylinder or a pneumatic cylinder and is coupled to an upper portion of the supply cylinder 7. The piston 10 is arranged in the cylinder 9. The piston 10 is coupled to the weight 8 via the piston rod 11 which airtightly passes through a lower lid side of the cylinder 9. The weight 8 is lowered as a result of pressurization of a space formed in an upper portion of the cylinder 9. As a result, the weight 8 pushes a material supplied from the hopper 6 into the chamber 2. The material mainly includes a polymer material such as a resin or rubber. The material may further include fillers (carbon, silica, or the like), additives, oil, and the like.

The casing 3 has an outlet in its bottom portion. The door 5, which is also called a drop door, opens and closes the outlet by power from an actuator (not shown). While a material is kneaded in the chamber 2, the door 5 blocks up the outlet. By opening the outlet, the door 5 discharges a kneaded product which has been kneaded in the chamber 2.

The pair of rotors 4 is arranged to be horizontally adjacent and in parallel to each other. Each of the pair of rotors 4 rotates inwardly. Each of the pair of rotors 4 has a plurality of kneading blades (not shown) on its outer circumference surface. There is a gap between a top of each kneading blade and the chamber 2. When the pair of rotors 4 rotates, a shearing force is applied to a material in the gap. Each kneading blade is spirally twisted around an axis of the pair of rotors 4. This twist causes a material to be pushed in an axial direction of the pair of rotors 4 and to axially flow.

The casing 3 has a flow passage (not shown) which extends in the axial direction of the pair of rotors 4 and in which a medium circulates. Each of the pair of rotors 4, the weight 8, and the door 5 also has a flow passage (not shown) in which a medium circulates.

The motor 12 causes the pair of rotors 4 to rotate via the reduction gear 13. The reduction gear 13 is provided between the motor 12 and the pair of rotors 4 to reduce a rotation speed of the pair of rotors 4. The driving unit 14 is configured by an air unit or a hydraulic unit. The driving unit 14 lowers the weight 8 by pressurizing a space in the upper portion of the cylinder 9 and raises the weight 8 by reducing the pressure of the space.

The controller 320 is in charge of overall control of the kneading device 300. For example, the controller 320 controls raising and lowering of the weight 8 by outputting a control signal for driving the driving unit 14. Further, the controller 320 controls a temperature of a material in the chamber 2 by controlling a heater (not shown). Further, the controller 320 controls rotation of the pair of rotors 4 by outputting a control signal for driving the motor 12. Further, the controller 320 controls opening and closing of the door 5 by outputting a control signal to the actuator (not shown). The input unit 350, which is configured by an operation device such as a switch, accepts an instruction from a user. A belt conveyor 15 conveys a material toward the hopper 6. Further, the controller 320 is in charge of control of the pair of rotors 4, control of a kneading time of a material, and control of an operation step of the kneading device.

Figure 2:
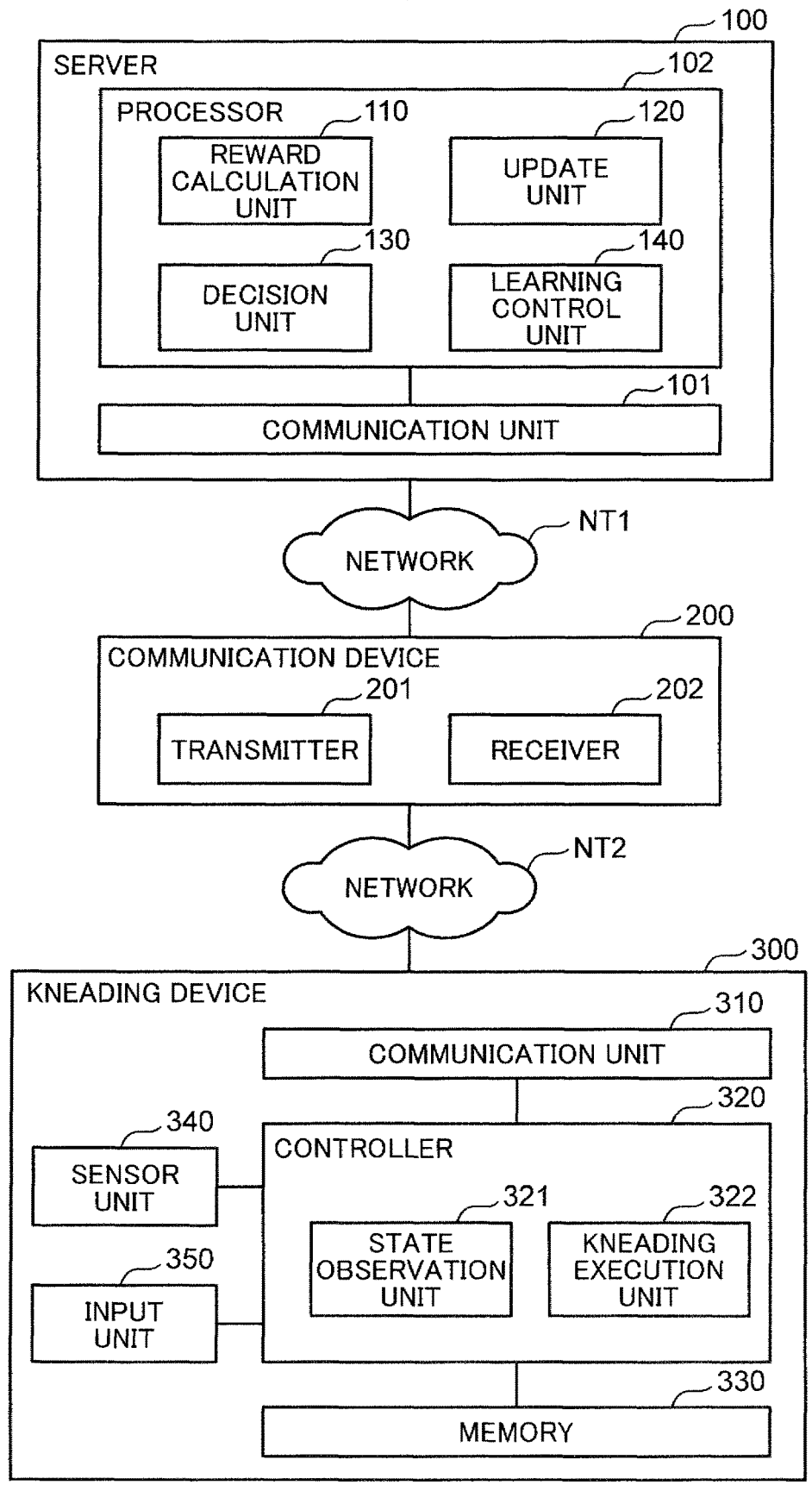
FIG. 2 is a diagram of an overall configuration of a machine learning system which causes the kneading device to conduct machine learning in the embodiment.

FIG. 2 is a diagram of an overall configuration of a machine learning system which causes the kneading device 300 to conduct machine learning in the embodiment. The machine learning system includes a server 100, a communication device 200, and the kneading device 300. The server 100 and the communication device 200 are communicably connected to each other via a network NT1. The communication device 200 and the kneading device 300 are communicably connected to each other via a network NT2. The network NT1 is, for example, a wide area communication network such as the Internet. The network NT2 is, for example, a local area network. The server 100 is, for example, a cloud server configured by one or more computers. The communication device 200 is, for example, a computer owned by a user who uses the kneading device 300. The communication device 200 functions as a gateway which connects the kneading device 300 to the network NT1. The communication device 200 is realized by installing dedicated application software in a computer owned by a user himself/herself. Alternatively, the communication device 200 may be a dedicated device provided to the user by a manufacturer of the kneading device 300.

A configuration of each device will be specifically described below. The server 100 includes a processor 102 and a communication unit 101. The processor 102 is a control device including a CPU and the like. The processor 102 includes a reward calculation unit 110, an update unit 120, a decision unit 130, and a learning control unit 140. Each block provided in the processor 102 may be realized by execution, by the processor 102, of a machine learning program which causes a computer to function as the server 100 in the machine learning system or may be realized by a dedicated electric circuit.

The reward calculation unit 110 calculates a reward for a decision result of at least one kneading condition based on a state variable observed by a state observation unit 321.

The update unit 120 updates a function for deciding a kneading condition from a state variable observed by the state observation unit 321 based on a reward calculated by the reward calculation unit 110. As a function, an action value function to be described later is adopted.

By repeating the update of a function while changing at least one kneading condition, the decision unit 130 decides a kneading condition under which a maximum reward can be obtained.

The learning control unit 140 takes charge of entire control of machine learning. The machine learning system of the present embodiment learns a kneading condition by reinforcement learning. Reinforcement learning is a machine learning method in which an agent (action subject) selects a certain action based on a situation of an environment to change the environment based on the selected action, and a reward following the environment change is applied to the agent, thereby allowing the agent to learn selection of a better action. As the reinforcement learning, Q-learning and TD-learning can be adopted. In the following, the description will be made with Q-learning as an example. In the present embodiment, the reward calculation unit 110, the update unit 120, the decision unit 130, the learning control unit 140, and the state observation unit 321 to be described later correspond to an agent. In the present embodiment, the communication unit 101 is one example of a state acquisition unit which acquires a state variable.

The communication unit 101 is configured by a communication circuit which connects the server 100 to the network NT1. The communication unit 101 receives a state variable observed by the state observation unit 321 via the communication device 200. The communication unit 101 transmits a kneading condition decided by the decision unit 130 to the kneading device 300 via the communication device 200. The communication unit 101 transmits a kneading execution command decided by the learning control unit 140 to the kneading device 300.

The communication device 200 includes a transmitter 201 and a receiver 202. The transmitter 201 transmits, to the server 100, a state variable transmitted from the kneading device 300 and also transmits, to the kneading device 300, a kneading condition transmitted from the server 100. The receiver 202 receives a state variable transmitted from the kneading device 300 and also receives a kneading condition transmitted from the server 100.

The kneading device 300 includes a communication unit 310, the controller 320, a memory 330, a sensor unit 340, and the input unit 350.

The communication unit 310 is a communication circuit for connecting the kneading device 300 to the network NT2. The communication unit 310 transmits a state variable observed by the state observation unit 321 to the server 100. The communication unit 310 receives a kneading condition decided by the decision unit 130 of the server 100. The communication unit 310 receives a processing execution command to be described later and decided by the learning control unit 140.

The controller 320 is a computer including a CPU and the like. The controller 320 includes the state observation unit 321 and a kneading execution unit 322. The communication unit 310 transmits a state variable acquired by the state observation unit 321 to the server 100. Each block provided in the controller 320 is realized, for example, by execution, by the CPU, of a machine learning program to be functioned as the kneading device 300 of the machine learning system.

The state observation unit 321 observes a state variable including a first evaluation parameter related to performance evaluation of a kneaded product and at least one kneading condition after the end of kneading. Here, the kneading conditions are a measurement value of the sensor unit 340 and a set value of the kneading execution unit 322. The kneading conditions are also the first evaluation parameter, a measurement value of the sensor unit 340, and the like. Further, the state observation unit 321 may acquire a second evaluation parameter related to operation stability of the kneading device 300.

FIG. 3 to FIG. 6 are diagrams each showing one example of a kneading condition. A kneading condition is roughly classified into a medium group. The medium group includes at least one of a first parameter related to a material, a second parameter related to rotor control, a third parameter related to an operation step, a fourth parameter related to weight operation, a fifth parameter related to temperature adjustment, and a sixth parameter related to machine specifications.

The first parameter includes at least one of a kind of input material including a mixing amount, a material weight, a material specific gravity, an input order, and a filling factor. The kind of input material further includes a kind of component of a material. The mixing amount includes an amount of each kind of component of a material or a ratio of amounts of the respective kinds. Kinds of components include, for example, rubber or resin, carbon, oil, additives, and the like. The material weight includes a weight of a component of a material. The material specific gravity represents a specific gravity of each kind of component in an input material. The input order represents an order for inputting a component of a material. The filling factor represents a ratio of a volumetric capacity (volume ratio) of a material to be input to the chamber 2 to a volumetric capacity of the chamber 2.

The second parameter includes at least one of the number of rotations of the rotor, a rotor phase, and a rotor speed ratio. The number of rotations of the rotor represents the number of rotations per unit time of the pair of rotors 4 in each operation step.

The kneading device 300 conducts step processing in which a material is input from the hopper 6 a plurality of times before a kneaded product is discharged from the door 5. Hereinafter, a process from input of a material until next input of a material or until cleaning of the material in one step processing will be referred to as a step unit. Specifically, one step processing is divided into one or more step units such as a first step unit (1st) and a second step unit (2nd). Further, each step unit is divided into a material input process and a kneading process or a cleaning process. These material input process, kneading process, and cleaning process will be generically called the operation step (one example of a step).

Time of material input indicates time of execution of the material input process. In the material input process, a material is input from the hopper 6 and the material is pushed into the chamber 2 by the weight 8. Time of kneading indicates time of execution of the kneading process. In the kneading process, with the weight 8 being lowered, the material is kneaded by the pair of rotors 4. Time of cleaning indicates time of execution of the cleaning process. The cleaning process is appropriately conducted in the second and subsequent step units in place of the material input process. In the second and subsequent step units, the weight 8 is raised at the start of the material input process or the cleaning process. In the second and subsequent step units, the weight is lowered at the start of the kneading process.

For example, "at the time of 1st. material input" indicates the number of rotations of the rotor in the material input process in the first step unit, and "at the time of 1st. kneading" indicates the number of rotations of the rotor in the kneading process in the first step unit. Additionally, "at the time of 2nd. material input or cleaning" indicates the number of rotations of the rotor in the material input process in the second step unit or the number of rotations of the rotor in the second cleaning process. The same applies to the third and subsequent step units. Although the first to third step units are shown here, fourth and subsequent step units may be provided.

The rotor phase represents a disposition angle of the pair of rotors 4. The pair of rotors 4 is disposed with its phase shifted by, for example, 90 degrees, 180 degrees, or the like. The rotor speed ratio represents a difference in the number of rotations per unit time between the pair of rotors 4.

Reference will be made to FIG. 4. The third parameter includes at least one of a kneading time in each step, a material input time, a step proceeding condition, a total kneading time, and accumulated electric power. The kneading time in each step represents time required for the kneading process in each step unit. For example, "1st kneading STEP" indicates a time of the kneading process in the first step unit. Although up to the third step units are shown here, the fourth and subsequent step units may be provided. The kneading time in each step may include a kneading time in at least one step unit among kneading times in a plurality of step units. For example, the kneading time in each step may only include a kneading time in "1st kneading STEP".

The material input time represents a time of the material input process in each step unit. "1st input STEP" is, for example, a time of the material input process in the first step unit. The material input time may include a material input time in at least one step unit among material input times in a plurality of step units. For example, the material input time may only include a kneading time in "1st input STEP".

The step proceeding condition is a condition for each operation step to proceed to a next operation step. The step proceeding condition includes at least one of a kneading time, a material temperature, a temperature of temperature-keeping kneading, instant electric power, accumulated electric power, an instant electric current, a torque, and a material temperature at discharging. The kneading time indicates a predetermined kneading time required to proceed to a next operation step. When the kneading time reaches the predetermined kneading time, the kneading process ends to proceed to a next operation step. The material temperature indicates a predetermined material temperature required to proceed to a next operation step. When the material temperature reaches the predetermined temperature, the kneading process ends to proceed to a next operation step. The temperature of temperature-keeping kneading represents a set temperature in a case of conducting kneading with a temperature fixed in the kneading process. The instant electric power indicates a predetermined instant electric power of the motor 12 required to proceed to a next operation step. When the instant electric power of the motor 12 reaches the predetermined instant electric power, the kneading process ends to proceed to a next operation step. The accumulated electric power indicates a predetermined accumulated electric power of the motor 12 required to proceed to a next operation step. When the accumulated electric power of the motor 12 reaches the predetermined accumulated electric power, the kneading process ends to proceed to a next operation step. The instant electric current indicates a predetermined instant electric current of the motor 12 required to proceed to a next operation step. When the instant electric current of the motor 12 reaches the predetermined instant electric current, the kneading process ends to proceed to a next operation step. The torque indicates a predetermined torque of the motor 12 required to proceed to a next operation step. When the torque of the motor 12 reaches the predetermined torque, the kneading process ends to proceed to a next operation step. The material temperature at discharging represents a predetermined temperature at the time of discharging a material. The step proceeding condition may include at least one condition among a plurality of conditions for processing to a next unit step. For example, the step proceeding condition may include at least one condition among a kneading time, a material temperature, a temperature of temperature-keeping kneading, instant electric power, accumulated electric power, an instant electric current, a torque, and a material temperature at discharging.

The total kneading time represents a total kneading time in one batch. The accumulated electric power represents a total electric power required in one batch.

Reference will be made to FIG. 5. The fourth parameter includes at least one of a weight cylinder pressure, a weight position, and a weight speed. The weight cylinder pressure represents a pressure applied when the weight 8 presses a material in the chamber 2 in the kneading process in each step unit. For example, "1st kneading STEP" indicates a weight cylinder pressure in the kneading process in the first step unit.

The weight position represents a position of the weight 8 when the weight 8 presses a material. The weight speed represents a speed of the weight 8 when the weight 8 presses a material.

The fifth parameter includes at least one of an outside air temperature, a machine parts temperature, and a circulating medium temperature. The outside air temperature represents an outside air temperature during the step processing. The machine parts temperature represents a temperature of each part of a machine during the step processing. Each part of the machine is, for example, the supply cylinder 7, the cylinder 9, the motor 12, the reduction gear 13, the casing 3, the pair of rotors 4, the door 5, or the like shown in FIG. 1.

The circulating medium temperature includes at least one of chamber-in, chamber-out, rotor-in, rotor-out, weight-in, weight-out, door-in, and door-out. The chamber-in represents a temperature of a circulating medium coming into the casing 3. The chamber-out represents a temperature of a circulating medium going out from the casing 3. The rotor-in represents a temperature of a circulating medium coming into the pair of rotors 4. The rotor-out represents a temperature of a circulating medium going out from the pair of rotors 4. The weight-in represents a temperature of a circulating medium coming into the weight 8. The weight-out represents a temperature of a circulating medium going out from the weight 8. The door-in represents a temperature of a circulating medium coming into the door 5. The door-out represents a temperature of a circulating medium going out from the door 5. The circulating medium temperature affects performance of a kneaded product. The circulating medium temperature can be used for calculating a heat history of a material to be kneaded. The circulating medium is, for example, cooling water, steam, hot oil, and the like. The circulating medium heats and/or cools the casing 3, the pair of rotors 4, the weight 8, the door 5, and the like.

Reference will be made to FIG. 6. The sixth parameter includes at least one of a rotor kind, surface treatment, a door-top shape, and a weight shape. The rotor kind indicates a kind of the pair of rotors 4 according to a shape. The surface treatment indicates a kind of hardening processing executed with respect to the chamber 2. Examples of the surface treatment include surface hardening treatments and the like. The surface treatment improves wear resistance and corrosion resistance of the chamber 2. The door-top shape indicates a kind of the door 5 according to a shape. The weight shape indicates a kind of the door 5 according to a shape.

The foregoing is one example of a kneading condition. Among the above-described kneading conditions, particularly essential parameters are as follows. Regarding the first parameter, essential parameters are, for example, "mixing amount" and "filling factor". Regarding the second parameter, an essential parameter is, for example, "the number of rotations of the rotor" at the time of kneading. Regarding the third parameter, essential parameters are, for example, "kneading time in each step", "step proceeding condition", "total kneading time", and "accumulated electric power". Regarding the fourth parameter, an essential parameter is, for example, "weight cylinder pressure". Regarding the fifth parameter, an essential parameter is, for example, "circulating medium temperature".

Next, the first evaluation parameter will be described. FIG. 7 is a diagram showing one example of the first evaluation parameter. The first evaluation parameter is roughly classified into a medium group. The medium group includes at least one of physical properties and shape characteristics. The physical properties include at least one of Mooney viscosity, vulcanization properties, the Payne effect, dispersion of an additive, dynamic viscoelasticity (Tan δ), hardness, tension stress, elongation, tension strength, real discharge weight, real discharge temperature, wear properties, bending strength, impact strength, breaking strength, modulus of elasticity, capillary viscosity, fluidity, and the number of rotations of rubber kneading (an amount of surface update). The shape characteristics include at least one of remaining particles and surface properties.

Next, the second evaluation parameter will be described. FIG. 8 is a diagram showing one example of the second evaluation parameter. The second evaluation parameter includes at least one medium group among state-weight, state-bearing, state-hydraulic pressure, and state-rotor. The state-weight indicates a state of a weight. The state-weight includes weight pressure fluctuation. The weight pressure fluctuation indicates fluctuation of a pressing pressure of the weight 8 at the time of kneading. Push-up of a material causes fluctuation of a pressing pressure. The state-bearing indicates a state of a bearing of the pair of rotors 4. The state-bearing includes at least one of a thrust load and a radial load. The thrust load is a load applied to the bearing of the pair of rotors 4 in a thrust direction during kneading. The radial load is a load applied to the bearing of the pair of rotors 4 in a radial direction during kneading.

The state-hydraulic pressure indicates a state of a hydraulic pressure of hydraulic oil for causing hydraulic equipment provided in the kneading device 300 to operate. The state-hydraulic pressure includes at least one of a mixer circuit pressure, a weight circuit pressure, and oil cleanliness. The mixer circuit pressure represents a pressure of hydraulic oil to be supplied to an actuator which drives the door 5. The weight circuit pressure represents a pressure of hydraulic oil to be supplied to an actuator which raises and lowers the weight 8. The oil cleanliness represents cleanliness of hydraulic oil.

The state-rotor indicates a state of the rotor 4. The state-rotor includes at least one of instant electric power, accumulated electric power, an instant electric current, and a torque. The instant electric power represents instant electric power of the motor 12. The accumulated electric power represents accumulated electric power of the motor 12. The instant electric current represents an instant electric current of the motor 12. The torque represents a torque of the motor 12.

Particularly essential parameters among the first evaluation parameters and the second evaluation parameters are, for example, Mooney viscosity, vulcanization properties, the Payne effect, dispersion of an additive, dynamic viscoelasticity, hardness, real discharge weight, and real discharge temperature.

Reference figure is returned to FIG. 2. The kneading execution unit 322 controls execution of kneading processing by the kneading device 300. For example, the kneading execution unit 322 controls raising and lowering of the weight 8, controls a pressure of a weight cylinder, controls a heater, controls the motor 12, controls opening and closing of the door 5, and the like as noted above with respect to the description of the controller 320.

The memory 330 is, for example, a non-volatile storage device, and stores a finally decided optimum kneading condition and the like.

The sensor unit 340 is each of various kinds of sensors for use in measurement of the kneading conditions illustrated in FIG. 3 to FIG. 6, the first evaluation parameters illustrated in FIG. 7, and the second evaluation parameters illustrated in FIG. 8. Specifically, the sensor unit 340 includes a sensor which detects the number of rotations of the rotor, a timer which measures a kneading time, a material input time, and the like, a sensor which measures a material temperature or a circulating medium temperature, a sensor which measures a current, a voltage, and an electric power to be supplied to the motor 12, a sensor which measures a torque of the motor 12, a sensor which measures a pressure of the weight 8, an outside air temperature sensor, a sensor which measures a position of the weight 8, a sensor which measures a speed of the weight 8, and the like. Further, the sensor unit 340 includes a sensor which measures weights of a material and a kneaded product, a sensor which measures loads applied to the bearing of the pair of rotors 4 in the thrust direction and the radial direction, and the like.

The input unit 350 is an input device such as a keyboard, a mouse, or the like. To the input unit 350, for example, various kinds of data included in the sixth parameter shown in FIG. 6 is input by a user. Further, to the input unit 350, for example, a measurement value of the first evaluation parameter shown in FIG. 7 is input by the user. Further to the input unit 350, for example, various kinds of data such as oil cleanliness shown in FIG. 8 is input.

Figure 9:
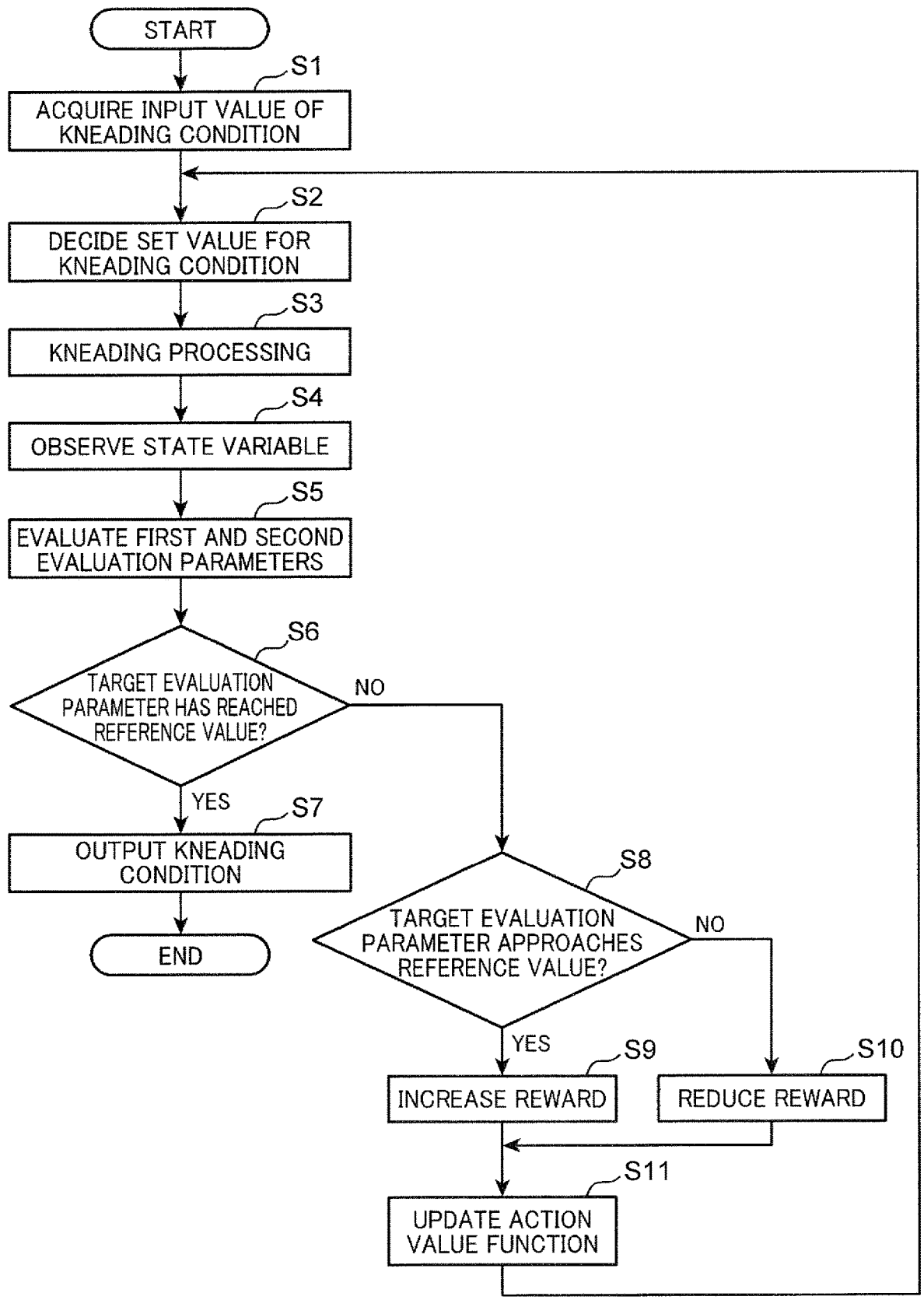
FIG. 9 is a flow chart showing one example of processing in the machine learning system shown in FIG. 2.

FIG. 9 is a flow chart showing one example of processing in the machine learning system shown in FIG. 2. In Step S1, the learning control unit 140 acquires an input value of a kneading condition input by a user using the input unit 350. Input values acquired here include a kind of input material including a mixing amount, a material weight, a material specific gravity, an input order, a filling factor, a rotor phase, and a rotor speed ratio which are shown in FIG. 3, a rotor kind, surface treatment, a door-top shape, and a weight shape which are shown in FIG. 6, and an outside air temperature and the like shown in FIG. 5.

In Step S2, the learning control unit 140 decides at least one kneading condition and a set value for the kneading condition. A kneading condition to be set here is at least one kneading condition for which a set value can be set among kneading conditions listed in FIG. 3 to FIG. 6. A kneading condition for which a set value can be set includes, for example, a kneading condition other than the kneading condition acquired as an input value in Step S1 among the kneading conditions illustrated in FIG. 3 to FIG. 6. A set value decided for the kneading condition corresponds to an action in reinforcement learning.

Specifically, the learning control unit 140 selects at random a set value for each kneading condition to be set. Here, a set value is selected at random for each kneading condition within a predetermined range. As a method of selecting a set value for a kneading condition, for example, the c-greedy method can be adopted.

In Step S3, the learning control unit 140 causes the kneading device 300 to start the kneading processing by transmitting a kneading execution command to the kneading device 300. When the kneading execution command is received by the communication unit 310, the kneading execution unit 322 sets a kneading condition according to the kneading execution command to start the kneading processing. The kneading execution command includes the input value of the kneading condition set in Step S1, the set value for the kneading condition decided in Step S2, and the like.

When the kneading processing ends, the state observation unit 321 observes a state variable (Step S4). Specifically, the state observation unit 321 acquires, as a state variable, the first evaluation parameter and the second evaluation parameter shown in FIG. 7 and FIG. 8, respectively, and a kneading condition to be observed among the kneading conditions shown in FIG. 3 to FIG. 6. The state observation unit 321 need only acquire a measurement value of various kinds of measuring instruments input to the input unit 350 and a measurement value measured by the sensor unit 340 as kneading conditions, the first evaluation parameter, and the second evaluation parameter. Alternatively, the first evaluation parameter and the second evaluation parameter may be acquired by communication of the kneading device 300 with various kinds of measuring instruments. Additionally, as a kneading condition to be observed, a predetermined kneading condition is adopted from among the kneading conditions shown in FIG. 3 to FIG. 6. The state observation unit 321 transmits the acquired state variable to the server 100 via the communication unit 310.

In Step S5, the decision unit 130 evaluates the first evaluation parameter and the second evaluation parameter. Here, the decision unit 130 evaluates the first evaluation parameter and the second evaluation parameter by determining whether an evaluation parameter to be evaluated (hereinafter referred to as a target evaluation parameter) reaches a predetermined reference value or not among the first evaluation parameter and the second evaluation parameter acquired in Step S4. The target evaluation parameter is one or a plurality of evaluation parameters among the first evaluation parameter and the second evaluation parameter listed in FIG. 7 and FIG. 8, respectively. In a case where a plurality of target evaluation parameters are present, a plurality of reference values will be present corresponding to the respective target evaluation parameters. As a reference value, for example, a predetermined value can be adopted which indicates that a target evaluation parameter reaches a fixed criteria.

The reference value may be a value including, for example, an upper limit value and a lower limit value. In this case, when a target evaluation parameter falls within a range between the upper limit value and the lower limit value, determination is made that the reference value is attained. The reference value may be one value. In this case, when the target evaluation parameter exceeds the reference value or when the target evaluation parameter falls below the reference value, determination is made that a fixed criteria is satisfied.

When it is determined that the target evaluation parameter has reached the reference value (YES in Step S6), the decision unit 130 outputs the kneading condition set in Step S2 as a final kneading condition (Step S7). By contrast, when it is determined that the target evaluation parameter has not reached the reference value (NO in Step S6), the decision unit 130 advances the processing to Step S8. In a case where a plurality of target evaluation parameters are present, when all target evaluation parameters have reached the reference value, the decision unit 130 need only determine YES in Step S6.

In Step S8, the reward calculation unit 110 determines whether the target evaluation parameter approaches the reference value or not. In a case where the target evaluation parameter approaches the reference value (YES in Step S8), the reward calculation unit 110 increases a reward for an agent (Step S9). By contrast, in a case where the target evaluation parameter does not approach the reference value (NO in Step S8), the reward calculation unit 110 reduces the reward for the agent (Step S10). In this case, the reward calculation unit 110 need only increase or decrease the reward according to a predetermined increasing or decreasing value of the reward. In a case where a plurality of target evaluation parameters are provided, the reward calculation unit 110 need only conduct determination of Step S8 with respect to each of the plurality of target evaluation parameters. In this case, the reward calculation unit 110 need only increase or decrease the reward for each of the plurality of target evaluation parameters based on the determination result of Step S8. As an increasing or decreasing value of the reward, a different value may be adopted according to the target evaluation parameter. For example, an increasing or decreasing value of a reward for the above-described essential evaluation parameter among the first evaluation parameter and the second evaluation parameter may be set to be larger than those for other evaluation parameters.

In Step S11, the update unit 120 updates an action value function by using the reward applied to the agent. Q-learning adopted in the present embodiment is a method of learning a Q value (Q(s, a)) as a worth of selecting an action "a" under a certain environment state "s". An environment state "$s_t$" corresponds to a state variable of the above flow. Then, in the Q-learning, the action "a" having the highest Q(s, a) is selected under the certain environment state "s". In the Q-learning, various actions "a" are taken under the certain environment state "s" by trial and error and rewards obtained then are used to learn right Q(s, a). Update formula of an action value function $Q(s_t,a_t)$ is represented by Formula (1) below.

[Mathematical Formula 1]

$$Q(s_t, a_t) \leftarrow Q(s_t, a_t) + \alpha\left(r_{t+1} + \gamma \max_a Q(s_{t+1}, a) Q(s_t, a_t)\right) \quad (1)$$

Here, "$s_t$" and $a_t$ represent an environment state and an action at time "t", respectively. The environment state is changed to "$s_{t+1}$" by the action $a_t$ and based on the change of the environment state, a reward "$r_{t+1}$" is calculated. Additionally, a term with max represents a result obtained by multiplying, by $\gamma$, a Q value ($Q(st_{+1},a)$) obtained in a case where a most valuable action "a" among actions found then is selected under the environment state "$s_{t+1}$". Here, $\gamma$ represents a discount rate and takes a value of $0 < \gamma \leq 1$ (ordinarily 0.9 to 0.99). $\alpha$ represents a learning coefficient and takes a value of $0 < \alpha \leq 1$ (ordinarily on the order of 0.1).

In a case where $\gamma \cdot \max Q(s_{t+1},a)$ is larger than $Q(s_t, a_t)$ as a Q value of the action "a" in the state "s", $\gamma \cdot \max Q(s_{t+1},a)$ being based on a Q value obtained when a best action is taken in the subsequent environment state "$s_{t+1}$" attained by the action "a", the update formula increases $Q(s_t, a_t)$. By contrast, when $\gamma \cdot \max Q(s_{t+1},a)$ is smaller than $Q(s_t,a_t)$, the update formula decreases $Q(s_t,a_t)$. In other words, a value of a certain action "a" in a certain state "$s_t$" is made to approach a value of a best action in the subsequent state "$s_{t+1}$" attained by the action "a". This enables an optimum kneading condition to be decided.

When the processing of Step S11 ends, the processing returns to Step S2, in which a set value for the kneading condition is changed, and the action value function is updated in the same manner. Although the update unit 120 updates the action value function, the present invention is not limited thereto and an action value table may be updated.

As Q(s,a), a value for each pair (s,a) of all the states and actions may be stored in a table format. Alternatively, Q(s,a) may be represented by an approximate function which approximates a value for each pair (s,a) of all the states and actions. This approximate function may be formed by a neural network having a multi-layered structure. In this case, the neural network need only conduct online learning in which data obtained by actually moving the kneading device 300 is learned in real time and is reflected in a next action. This realizes deep reinforcement learning.

In a conventional kneading device, kneading conditions have been developed by changing kneading conditions so as to obtain an excellent kneaded product. For obtaining an excellent kneading condition, it is demanded to find a relationship between the first evaluation parameter and the second evaluation parameter and the kneading condition. However, since kinds of kneading conditions are numerous as shown in FIG. 3 to FIG. 6, knowledge has been obtained that extremely many physical models are required for defining such a relationship and that it is difficult to describe such a relationship with a physical model. Further, for creating such a physical model, it is also demanded to artificially find which parameter affects evaluation of which evaluation parameter, and it is therefore difficult to create this physical model.

According to the present embodiment, the above-described first to sixth parameters and first evaluation parameter and second evaluation parameter are observed as a state variable. Then, a reward for a decision result of a kneading condition is calculated based on the observed state variable, an action value function for deciding a kneading condition from the state variable is updated based on the calculated reward, and the update is repeated to learn a kneading condition under which a maximum reward is obtained. Thus, the present embodiment enables a kneading condition to be decided by machine learning without using the above-described physical model. As a result, the present embodiment enables an appropriate kneading condition to be decided with ease without relying on years of experience of skilled operators.

The present invention can adopt the following modification.

Figure 10:
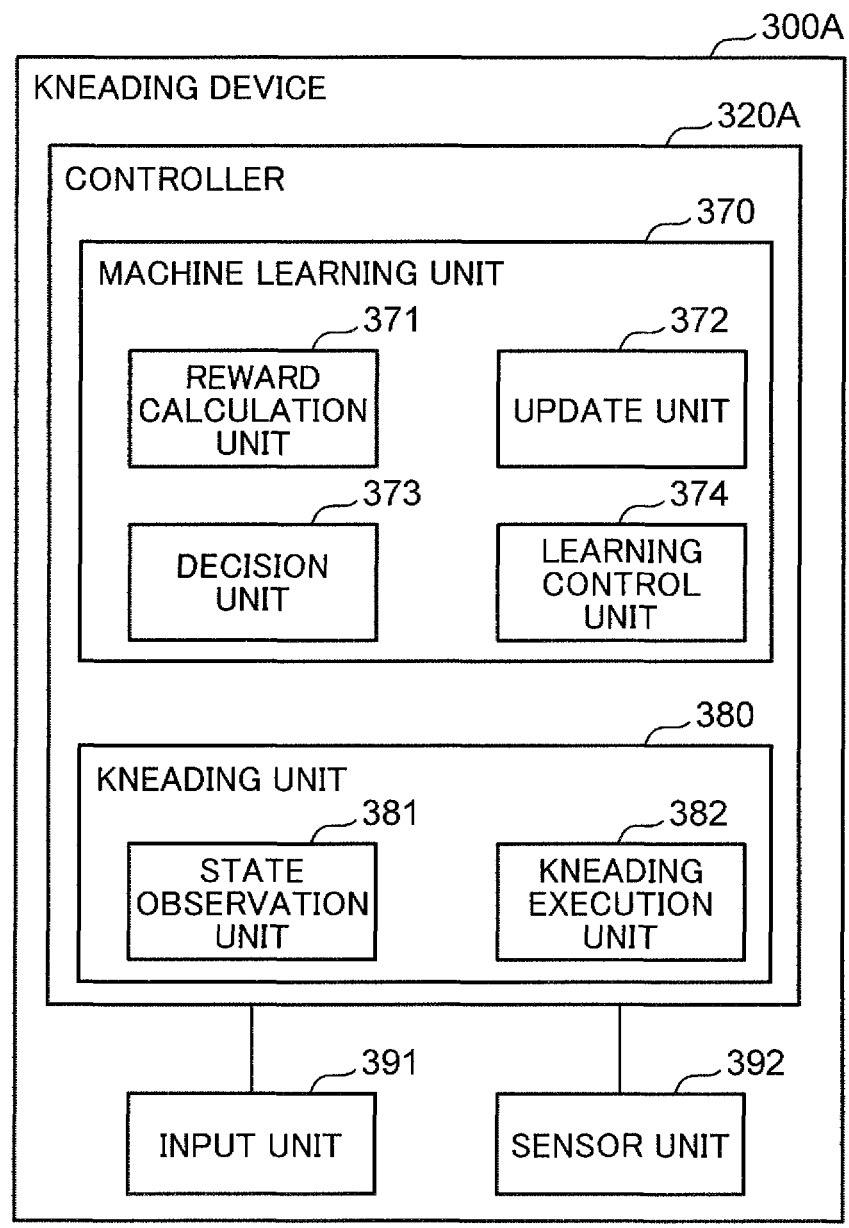
FIG. 10 is a diagram of an overall configuration of a machine learning system according to a modification of the present invention.

(1) FIG. 10 is a diagram of an overall configuration of a machine learning system according to a modification of the present invention. The machine learning system according to the modification is configured with an integrated kneading device 300A. The kneading device 300A includes a controller 320A, an input unit 391, and a sensor unit 392. The controller 320A includes a machine learning unit 370 and a kneading unit 380. The machine learning unit 370 includes a reward calculation unit 371, an update unit 372, a decision unit 373, and a learning control unit 374. The reward calculation unit 371 to the learning control unit 374 are the same as the reward calculation unit 110 to the learning control unit 140 shown in FIG. 2, respectively. The kneading unit 380 includes a state observation unit 381 and a kneading execution unit 382. The state observation unit 381 and the kneading execution unit 322 are the same as the state observation unit 321 and the kneading execution unit 322 shown in FIG. 2, respectively. The input unit 391 and the sensor unit 392 are the same as the input unit 350 and the sensor unit 340 shown in FIG. 2, respectively. In the present modification, the state observation unit 381 is one example of a state acquisition unit which acquires state information.

Thus, the machine learning system according to the modification enables the integrated kneading device 300A to learn an optimum kneading condition.

(2) In the above flow chart, a state variable is observed after the processing ends. However, this is one example and a plurality of state variables may be observed during one processing. For example, in a case where a state variable is configured only by instantly measurable parameters, a plurality of state variables can be observed during one processing. This realizes reduction in learning time.

CONCLUSION OF EMBODIMENTS

A machine learning method according to one aspect of the present invention is a machine learning method for a machine learning device to decide a kneading condition of a kneading device for kneading a polymer material to obtain a kneaded product, the kneading device including: a chamber to which a material to be kneaded is input; two or more rotors which knead the material input to the chamber; and a controller in charge of control of the two or more rotors, control of a kneading time of the material, and control of an operation step of the kneading device, the machine learning method including: acquiring a state variable including at least one first evaluation parameter related to performance evaluation of the kneaded product and at least one kneading condition; calculating a reward for a decision result of the at least one kneading condition based on the state variable; updating a function for deciding the at least one kneading condition from the state variable based on the reward; and by repeating the update of the function, deciding a kneading condition under which the reward obtained becomes maximum, in which the at least one first evaluation parameter includes at least one of physical properties and shape characteristics related to the kneaded product.

According to the present aspect, at least one kneading condition is acquired as a state variable. Further, the first evaluation parameter including at least one of physical properties and shape characteristics of a kneaded product is acquired as a state variable.

Then, a reward for a decision result of the kneading condition is calculated based on the acquired state variable, a function for deciding the kneading condition from the state variable is updated based on the calculated reward, and the update is repeated to learn a kneading condition under which a maximum reward is obtained. Thus, the present configuration enables an appropriate kneading condition to be decided with ease without relying on years of experience of skilled operators.

In the above machine learning method, the at least one kneading condition may be at least one of a first parameter related to the material and a second parameter related to control of the rotor.

According to the present configuration, since at least one kneading condition of the first parameter related to a material of a kneaded product and the second parameter related to rotor control is acquired as a state variable, a more optimum kneading condition can be decided taking the first parameter and the second parameter into consideration.

In the above machine learning method, the at least one kneading condition may be at least one of a first parameter related to the material, a second parameter related to control of the rotor, and a third parameter related to an operation step. The third parameter is selected from at least one of: a kneading time in at least one of a plurality of steps; a material input time in at least one of the plurality of steps; at least one condition out of conditions for proceeding to a next step; a total kneading time; and accumulated electric power.

According to the present configuration, since at least one kneading condition of the first parameter related to a material of a kneaded product, the second parameter related to control of the rotor, and the third parameter related to an operation step is acquired as a state variable, a more optimum kneading condition can be decided taking the first parameter, the second parameter, and the third parameter into consideration.

In the above machine learning method, the kneading device preferably further includes a weight, and the at least one kneading condition includes a fourth parameter related to operation of the weight.

According to the present aspect, since the fourth parameter related to the weight is further acquired as a state variable, a more appropriate kneading condition can be decided.

In the above machine learning method, the kneading device preferably further includes a temperature adjustment mechanism, in which the at least one kneading condition includes a fifth parameter related to temperature adjustment.

According to the present aspect, since the fifth parameter related to temperature adjustment is further acquired as a state variable, a more appropriate kneading condition can be decided.

In the above machine learning method, the first parameter preferably includes at least one of a mixing amount of the material, an order for inputting a component of the material, and a filling factor of the chamber with the material.

According to the present aspect, since at least one of a mixing amount of a material, an order for inputting a component of the material, and a filling factor of a chamber with the material is adopted as the first parameter, a more appropriate kneading condition can be decided.

In the above machine learning method, the second parameter preferably includes at least one of the number of rotations of the two or more rotors, phases of the two or more rotors, and a speed ratio of each of the rotors.

According to the present aspect, since at least one of the number of rotations of the two or more rotors, phases of the two or more rotors, and a speed ratio of each of the rotors is adopted as the second parameter, a more appropriate kneading condition can be decided.

In the above machine learning method, in the third parameter, the condition for proceeding to a next step preferably includes at least one of a kneading time in each step, a temperature of the material, a temperature of the material to be maintained in each step, instant electric power of a motor which drives the two or more rotors, accumulated electric power of the motor, an instant electric current of the motor, a torque of the motor, and a temperature of the material at discharging.

According to the present aspect, since as a condition for proceeding to a next step, at least one of a kneading time in each step, a material temperature to be maintained in each step, instant electric power of a motor which drives the two or more rotors, accumulated electric power of the motor, an instant electric current of the motor, a torque of the motor, and a temperature of the material at discharging is adopted as the third parameter, a more appropriate kneading condition can be decided.

In the above machine learning method, the fourth parameter preferably includes at least one of a pressing pressure of the weight at the time of pushing the material into the chamber, a position of the weight, and a speed of the weight.

According to the present aspect, since at least one of a pressing pressure of a weight at the time of pushing a material into a chamber, a position of the weight, and a speed of the weight is adopted as the fourth parameter, a more appropriate kneading condition can be decided.

In the above machine learning method, the fifth parameter preferably includes at least one of a temperature of a circulating medium coming into the chamber, a temperature of a circulating medium going out from the chamber, a temperature of a circulating medium coming into the two or more rotors, a temperature of a circulating medium going out from the two or more rotors, a temperature of a circulating medium coming into a door from which the material is to be discharged, and a temperature of a circulating medium going out from the door.

According to the present aspect, since at least one of a temperature of a circulating medium coming into a chamber, a temperature of a circulating medium going out from the chamber, a temperature of a circulating medium coming into the two or more rotors, a temperature of a circulating medium going out from the rotors, a temperature of a circulating medium coming into a door, and a temperature of a circulating medium going out from the door is adopted as the fifth parameter, a more appropriate kneading condition can be decided.

In the above machine learning method, the state variable preferably further includes a second evaluation parameter related to operation stability of the kneading device.

According to the present aspect, since a state variable includes a parameter related to operation stability, a kneading condition under which an appropriate kneaded product is obtained can be obtained while seeking operation stability of the kneading device.

In the above machine learning method, the physical properties preferably include at least one of Mooney viscosity, vulcanization properties, Payne effect, dispersion of an additive, dynamic viscoelasticity, hardness, a weight of the kneaded product, and a temperature of the kneaded product.

According to the present aspect, since at least one of Mooney viscosity, vulcanization properties, the Payne effect, dispersion of an additive, dynamic viscoelasticity, hardness, a weight of the kneaded product, and a temperature of the kneaded product is adopted as physical properties, it is possible to obtain, with ease, a kneading condition under which a kneaded product satisfying these physical properties can be obtained.

In the above machine learning method, the function is preferably updated in real time using deep reinforcement learning.

According to the present aspect, since update of a function is conducted in real time using deep reinforcement learning, update of a function can be conducted precisely and quickly.

In the above machine learning method, in calculation of the reward, the reward is preferably increased in a case where the at least one first evaluation parameter approaches a predetermined reference value corresponding to each first evaluation parameter, and the reward is preferably decreased in a case where the at least one first evaluation parameter does not approach the reference value corresponding to each first evaluation parameter.

According to the present aspect, since a reward is increased as the first evaluation parameter approaches a reference value, the first evaluation parameter can be made to quickly reach to the reference value.

In the present invention, each processing provided in the above machine learning method may be implemented in a machine learning device or implemented as a machine learning program to be distributed. The machine learning device may be configured by a server or configured by a kneading device.

A communication method according to still another aspect of the present invention is a communication method conducted at the time of machine learning of a kneading condition for a kneading device which kneads a polymer material to obtain a kneaded product, the kneading device including: a chamber to which a material for obtaining the kneaded product is input; two or more rotors which knead the material input to the chamber; and a controller in charge of control of the two or more rotors, control of a kneading time of the material, and control of an operation step of the kneading device, the communication method including: observing a state variable including at least one first evaluation parameter related to performance evaluation of the kneaded product and at least one kneading condition; and transmitting the state variable onto a network and receiving a machine-learned kneading condition, in which the at least one first evaluation parameter includes at least one of physical properties and shape characteristics related to the kneaded product.

According to the present aspect, information necessary for machine learning of a kneading condition is provided. Such a communication method can be implemented also in a kneading device.

The invention claimed is:

1. A machine learning method for a machine learning device to decide a kneading condition of a kneading device for kneading a polymer material to obtain a kneaded product, the kneading device including:
   a chamber to which a material to be kneaded is input;
   two or more rotors which knead the material input to the chamber; and
   a controller in charge of control of the two or more rotors, control of a kneading time of the material, and control of an operation step of the kneading device, the machine learning method comprising:
   acquiring a state variable including at least one first evaluation parameter related to performance evaluation of the kneaded product and at least one kneading condition;
   calculating a reward for a decision result of the at least one kneading condition based on the state variable;
   updating a function for deciding the at least one kneading condition from the state variable based on the reward; and
   by repeating the update of the function, deciding a kneading condition under which the reward obtained becomes maximum,
   wherein the at least one first evaluation parameter includes at least one of physical properties and shape characteristics related to the kneaded product.

2. The machine learning method according to claim 1, wherein the at least one kneading condition is at least one of a first parameter related to the material and a second parameter related to control of the two or more rotors.

3. The machine learning method according to claim 1, wherein
   the at least one kneading condition is at least one of:
   a first parameter related to the material;
   a second parameter related to control of the two or more rotors; and
   a third parameter related to an operation step,
   the third parameter being selected from at least one of:
   a kneading time in at least one of a plurality of steps;
   a material input time in at least one of the plurality of steps;
   at least one condition out of conditions for proceeding to a next step;
   a total kneading time; and
   accumulated electric power.

4. The machine learning method according to claim 1, wherein
   the kneading device further includes a weight, and
   the at least one kneading condition includes a fourth parameter related to operation of the weight.

5. The machine learning method according to claim 1, wherein
   the kneading device further includes a temperature adjustment mechanism, and
   the at least one kneading condition includes a fifth parameter related to temperature adjustment.

6. The machine learning method according to claim 2, wherein the first parameter includes at least one of a mixing amount of the material, an order for inputting a component of the material, and a filling factor of the chamber with the material.

7. The machine learning method according to claim 2, wherein the second parameter includes at least one of the number of rotations of the two or more rotors, phases of the two or more rotors, and a speed ratio of each of the rotors.

8. The machine learning method according to claim 3, wherein in the third parameter, the condition for proceeding to a next step includes at least one of a kneading time for proceeding to a next step, a temperature of the material, a temperature of the material to be maintained in each step, instant electric power of a motor which drives the two or more rotors, accumulated electric power of the motor, an instant electric current of the motor, a torque of the motor, and a temperature of the material at discharging.

9. The machine learning method according to claim 4, wherein the fourth parameter includes at least one of a pressing pressure of the weight at the time of pushing the material into the chamber, a position of the weight, and a speed of the weight.

10. The machine learning method according to claim 5, wherein the fifth parameter includes at least one of a temperature of a circulating medium coming into the chamber, a temperature of a circulating medium going out from the chamber, a temperature of a circulating medium coming into the two or more rotors, a temperature of a circulating medium going out from the two or more rotors, a temperature of a circulating medium coming into a door from which the material is to be discharged, and a temperature of a circulating medium going out from the door.

11. The machine learning method according to claim 1, wherein the state variable further includes a second evaluation parameter related to operation stability of the kneading device.

12. The machine learning method according to claim 1, wherein the physical properties include at least one of Mooney viscosity, vulcanization properties, Payne effect, dispersion of an additive, dynamic viscoelasticity, hardness, a weight of the kneaded product, and a temperature of the kneaded product.

13. The machine learning method according to claim 1, wherein the function is updated in real time using deep reinforcement learning.

14. The machine learning method according to claim 1, wherein
in calculation of the reward, the reward is increased in a case where the at least one first evaluation parameter approaches a predetermined reference value corresponding to each first evaluation parameter, and the reward is decreased in a case where the at least one first evaluation parameter does not approach the reference value corresponding to each first evaluation parameter.

15. A machine learning device which decides a kneading condition of a kneading device for kneading a polymer material to obtain a kneaded product, the kneading device including:
a chamber to which a material for obtaining the kneaded product is input;
two or more rotors which knead the material input to the chamber; and
a controller in charge of control of the two or more rotors, control of a kneading time of the material, and control of an operation step of the kneading device,
the machine learning device comprising:
a state acquisition unit which acquires a state variable including at least one first evaluation parameter related to performance evaluation of the kneaded product and at least one kneading condition;
a reward calculation unit which calculates a reward for a decision result of the at least one kneading condition based on the state variable;
an update unit which updates a function for deciding the at least one kneading condition from the state variable based on the reward; and
a decision unit which, by repeating the update of the function, decides a kneading condition under which the reward obtained becomes maximum,
wherein the at least one first evaluation parameter includes at least one of physical properties and shape characteristics related to the kneaded product.

16. A non-transitory computer-readable recording medium which records a machine learning program of a machine learning device which decides a kneading condition of a kneading device for kneading a polymer material to obtain a kneaded product, the kneading device including:
a chamber to which a material for obtaining the kneaded product is input;
two or more rotors which knead the material input to the chamber; and
a controller in charge of control of the two or more rotors, control of a kneading time of the material, and control of an operation step of the kneading device, the machine learning program causing a computer to function as,
the machine learning device comprising:
a state acquisition unit which acquires a state variable including at least one first evaluation parameter related to performance evaluation of the kneaded product and at least one kneading condition;
a reward calculation unit which calculates a reward for a decision result of the at least one kneading condition based on the state variable;
an update unit which updates a function for deciding the at least one kneading condition from the state variable based on the reward; and
a decision unit which, by repeating the update of the function, decides a kneading condition under which the reward obtained becomes maximum,
wherein the at least one first evaluation parameter includes at least one of physical properties and shape characteristics related to the kneaded product.

17. A communication method conducted at the time of machine learning of a kneading condition for a kneading device which kneads a polymer material to obtain a kneaded product, the kneading device including:
a chamber to which a material for obtaining the kneaded product is input;
two or more rotors which knead the material input to the chamber; and
a controller in charge of control of the two or more rotors, control of a kneading time of the material, and control of an operation step of the kneading device,
the communication method comprising:
observing a state variable including at least one first evaluation parameter related to performance evaluation of the kneaded product and at least one kneading condition;
transmitting the state variable onto a network; and
receiving a machine-learned kneading condition based on a reward for a decision result of the at least one kneading condition calculated based on the state variable, the at least one kneading condition decided based on updating a function from the state variable based on the reward, and the kneading condition machine-learned kneading condition decided by repeating the updating of the function under which the reward obtained becomes maximum, wherein the at least one first evaluation parameter includes at least one of physical properties and shape characteristics related to the kneaded product.

18. A kneading device which kneads a polymer material to obtain a kneaded product, the kneading device comprising:
   a chamber to which a material for obtaining the kneaded product is input;
   two or more rotors which knead the material input to the chamber;
   a controller in charge of control of the two or more rotors, control of a kneading time of the material, and control of an operation step of the kneading device;
   a state observation unit which acquires a state variable including at least one first evaluation parameter related to performance evaluation of the kneaded product and at least one kneading condition; and
   a communication unit which transmits the state variable onto a network and receives a machine-learned kneading condition based on a reward for a decision result of the at least one kneading condition calculated based on the state variable, the at least one kneading condition decided based on updating a function from the state variable based on the reward, and the kneading condition machine-learned kneading condition decided by repeating the updating of the function under which the reward obtained becomes maximum, wherein the at least one first evaluation parameter includes at least one of physical properties and shape characteristics related to the kneaded product.

* * * * *